(12) United States Patent
Lusty

(10) Patent No.: US 7,887,026 B2
(45) Date of Patent: Feb. 15, 2011

(54) SHRUB REMOVER

(75) Inventor: Robert H. Lusty, Alexandria, MN (US)

(73) Assignee: BAC Industries, Inc., Hopkins, MN (US)

( * ) Notice: Subject to any disclaimer, the term of this patent is extended or adjusted under 35 U.S.C. 154(b) by 192 days.

(21) Appl. No.: 12/368,798

(22) Filed: Feb. 10, 2009

(65) Prior Publication Data

US 2010/0200820 A1  Aug. 12, 2010

(51) Int. Cl.
*B66F 3/00* (2006.01)
(52) U.S. Cl. .................... 254/133 R; 254/134
(58) Field of Classification Search ............ 254/133 R, 254/134, 134.3 FT
See application file for complete search history.

(56) References Cited

U.S. PATENT DOCUMENTS

| | | | |
|---|---|---|---|
| 1,260,041 A | 3/1918 | Powell | |
| 1,261,600 A | 4/1918 | Olson | |
| 1,420,667 A * | 6/1922 | Randle | 152/228 |
| 1,574,014 A * | 2/1926 | Allmon | 152/240 |
| 1,686,288 A * | 10/1928 | Meals | 294/74 |
| 1,763,998 A * | 6/1930 | Allmon | 152/240 |
| 2,342,455 A * | 2/1944 | Dahlander | 294/77 |
| 2,822,210 A * | 2/1958 | Gebhart | 294/109 |
| 2,895,762 A * | 7/1959 | Seving | 294/67.4 |
| 3,582,125 A * | 6/1971 | Collins | 294/74 |
| 3,583,750 A * | 6/1971 | Norton | 294/74 |
| 3,946,988 A | 3/1976 | Kehren | |
| 3,992,048 A * | 11/1976 | Berzenye | 294/74 |
| 4,059,302 A * | 11/1977 | Barthule | 294/74 |
| 4,093,292 A * | 6/1978 | Marcet et al. | 294/74 |
| 4,359,241 A * | 11/1982 | Kistner | 294/82.13 |
| 4,826,137 A | 5/1989 | Ahrgal | |
| 4,893,783 A | 1/1990 | Diener et al. | |
| 5,382,131 A * | 1/1995 | Werthmann | 414/684.3 |
| 5,577,712 A * | 11/1996 | White, Jr. | 256/7 |
| 5,682,840 A * | 11/1997 | McFarland | 119/856 |
| 5,785,146 A * | 7/1998 | Palmer | 182/3 |
| 7,137,239 B2 | 11/2006 | Paterson | |

* cited by examiner

*Primary Examiner*—Lee D Wilson
(74) *Attorney, Agent, or Firm*—Thomas J. Nikolai; Nikolai & Mersereau, P.A.

(57) ABSTRACT

In some embodiments, a shrub removing apparatus may include one or more of the following features: (a) a chain segment having a chain link, (b) a barb coupled to the chain link, (c) a first circular ring coupled to the chain segment at a proximal end, and (d) a second circular ring coupled to the chain segment at a distal end.

5 Claims, 3 Drawing Sheets

SHRUB REMOVER

I. FIELD OF THE INVENTION

Embodiments of the present invention generally relate to landscape maintenance tools. Particularly, embodiments of the present invention relate to tools for the removal of plant life from the ground. More particularly, embodiments of the present invention relate to devices for use in uprooting of shrubs, bushes and small trees from the soil.

II. BACKGROUND

A shrub or bush is a horticultural rather than strictly botanical category of woody plant, distinguished from a tree by its multiple stems and lower height, usually less than 5-6 meters (15-20 feet). A large number of plants can be either shrubs or trees, depending on the growing conditions they experience. Small, low shrubs such as lavender, periwinkle and thyme are often termed subshrubs.

An area of cultivated shrubs in a park or garden is known as a shrubbery. When clipped as topiary, shrubs generally have dense foliage and many small leafy branches growing close together. Many shrubs respond well to renewal pruning, in which hard cutting back to a 'stool' results in long new stems known as "canes". Other shrubs respond better to selective pruning to reveal their structure and character.

Shrubs in common garden practice are generally broad-leaved plants, though some smaller conifers such as Mountain Pine and Common Juniper are also shrubby in structure. Shrubs can be either deciduous or evergreen.

Homeowners, foresters, agriculturists, landscape workers and the like often need to permanently remove unwanted shrubs, bushes and small trees. Rangers and volunteers who care for public park woodlands face an ongoing need to remove invading exotic shrubs and bushes disrupting the balanced ecosystem of native plant varieties. Problems associated with clearing young shrubs and woody bushes from an area have involved back-breaking toil, using picks and shovels to uncover the roots and then pulling by hand or with the help of draft animals, or in more modern times with tractors and winches. While this approach was effective, it was laborious, it required considerable physical strength, and it disturbed a much larger area than the plant occupied.

Another approach was to cut the plant at the soil line using one of a variety of hand or fuel-powered blade tools, leaving the plant's root system intact beneath the surface. This left an area looking cleared with a minimum of disturbance to the surroundings, but soon new growth would appear from the old roots, and the plant would come back bushier and more difficult to remove than before. Furthermore, blade tools required strength and skill to use; fuel-powered tools provided noise and fumes, as well as high purchase and maintenance costs.

A third approach was to use herbicides to kill the unwanted shrub or bush. A trained operator used expensive and potentially hazardous chemicals in a spraying apparatus to poison the target plant. The nearby desirable plants were often harmed by overspray of the herbicide. When the target plant was dead, there still remained the problem of extracting it. Many questions remain about the long-term effects of herbicides on humans, wild animals and the environment. Therefore, public park agencies and property owners have become reluctant to use chemical herbicides. Parks in particular use chemicals only as a last resort rather than provoke public outrage.

Most users, therefore, would find it desirable to have a tool which could grip an unwanted shrub or bush and uproot it completely, easily and safely without undue disturbance to neighboring vegetation or harm to the user or to the environment. It would also be desirable to provide a tool for easily grasping and uprooting shrubs, bushes or small trees; to provide such a tool which can be effectively and safely operated by a person of ordinary physical strength and with little training or experience; to provide such a tool which acts selectively on the target plant with minimum disturbance to surrounding vegetation; to provide such a tool which extracts sufficient root to kill the plant, leaving nothing to re-sprout later; and to provide such a tool which requires no chemicals for its effective operation. It would be further desirable to provide a tool which is easily carried to the site of operation; to provide such a tool which requires little storage space and minimal maintenance.

III. SUMMARY OF THE INVENTION

In some embodiments, a shrub removing apparatus may include one or more of the following features: (a) a chain segment having a chain link, (b) a barb coupled to the chain link, (c) a first circular ring coupled to the chain segment at a proximal end, and (d) a second circular ring coupled to the chain segment at a distal end.

In some embodiments, a woody plant removal apparatus may include one or more of the following features: (a) a chain segment having a plurality of chain links, (b) a barb coupled to at least one chain link, (c) a circular ring coupled to an end of the chain segment, (d) a second circular ring located at an opposite end of the chain segment from the first circular ring.

In some embodiments, a method of manufacturing a shrub removal apparatus may include one or more of the following steps: (a) coupling a barb to at least one chain link of a chain segment, (b) coupling a first circular ring to a proximal end of the chain segment, (c) coupling a second circular ring to a distal end of the chain segment.

IV. DESCRIPTION OF THE DRAWINGS

V. DESCRIPTION OF THE PREFERRED EMBODIMENT

Figure 1:
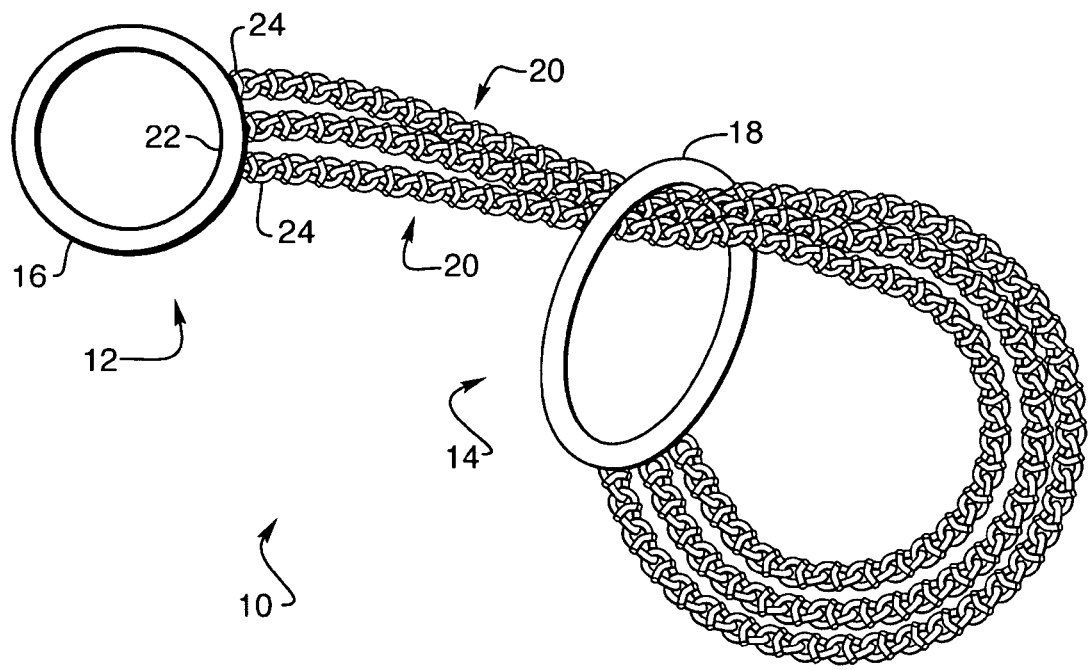
FIG. 1 shows a top profile view of a shrub remover in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the invention discussed below are discussed in detail with respect to removal of small trees and shrub, it is fully contemplated embodiments of the present invention could be utilized for most any type of vegetation without departing from the spirit of the invention. While embodiments of the present invention disclose the removal of shrubs, it is fully contemplated embodiments of the present invention could be used on bushes, trees and small clumps of shrubs, bushes or trees.

With reference to FIG. 1, a top profile view of a shrub remover in an embodiment of the present invention is shown. Shrub remover 10 can have a proximal end 12 and a distal end 14. Proximal end 12 can have a circular ring 16 which can have a slightly smaller diameter than circular ring 18 located on distal end 14. Circular rings 16 and 18 can be made out of a strong metal, such as steel or iron; however, it is contemplated circular rings 16 and 18 could be made out of most any durable material, such as hardened plastic, without departing from the spirit of the invention. Chain segments 20 extend between circular rings 16 and 18. Chain segments 20 can be made out of a strong metal, such as steel or iron; however, it is contemplated chain segments 20 could be made out of most any durable material, such as hardened plastic, without departing from the spirit of the invention. Chain segments 20 are coupled to a side 22 of circular rings 16 and 18. Chain segments 20 can be welded to circular rings 16 and 18 by welding a link 24 directly to circular rings 16 and 18. It is fully contemplated chain segments 20 could be coupled most anywhere on circular rings 16 and 18 without departing from the spirit of the invention. However, the inventor has found a connection to one side 22 has proven more effective for the operation of shrub remover 10.

Figure 2:
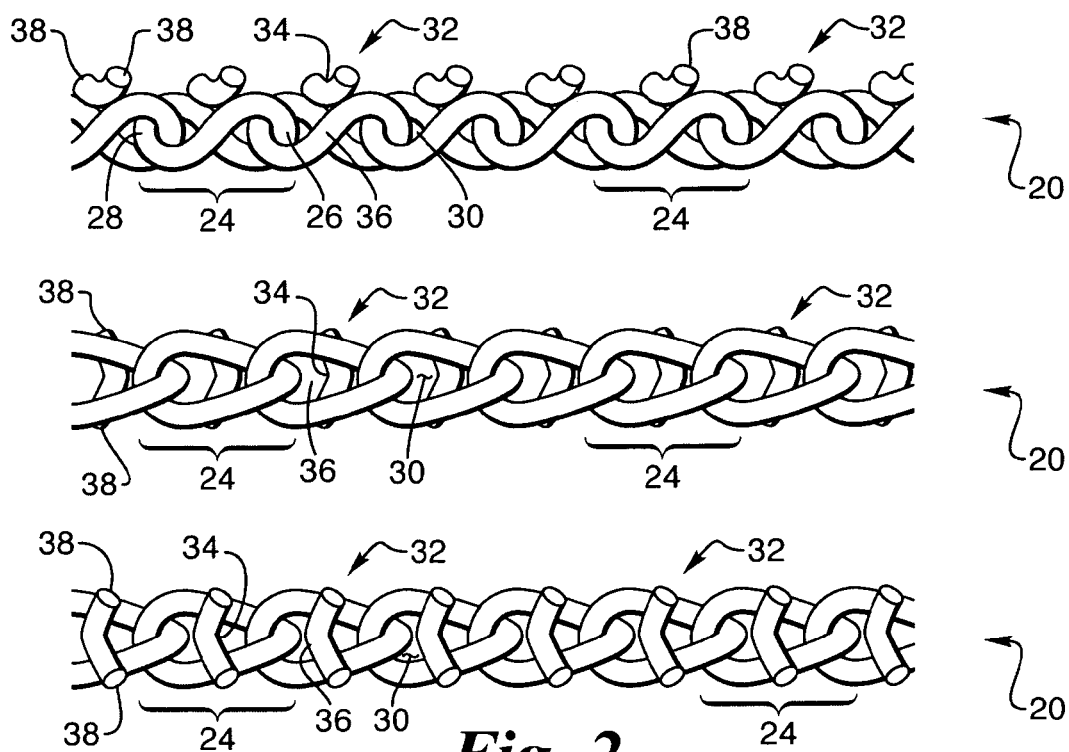
FIG. 2 shows a portion of a chain segment for a shrub remover in an embodiment of the present invention.

With reference to FIG. 2, a portion of a chain segment for shrub remover 10 in an embodiment of the present invention is shown. Chain segment 20 can be made up of a plurality of chain links 24. Chain links 24 can take most any shape without departing from the spirit of the invention; however, the inventor has found the shape shown in FIG. 2 to work well in operation of shrub remover 10. Chain links 24 have an oval shape with a twisted body which resembles the number 8 on its side or the recognized symbol for infinity ∞. Each link 24 has a proximal end 26 and a distal end 28. Each link 24 has another link interwoven in open space 30 located at both distal end 28 and proximal end 26. Coupled across chain link 24 longitudinally is a barb 32. Barb 32 can be welded to chain link 24; however, other methods of coupling could be used without departing from the spirit of the invention. Midsection 34 of barb 32 bows in towards center 36 of chain link 24. This bowing causes barb ends 38 to extend out and away from chain link 24. Barb ends 38 terminate in a sharp corner to provide good gripping action when pressed against the surface of a shrub, bush, small tree or clumps of small trees.

Figure 3:
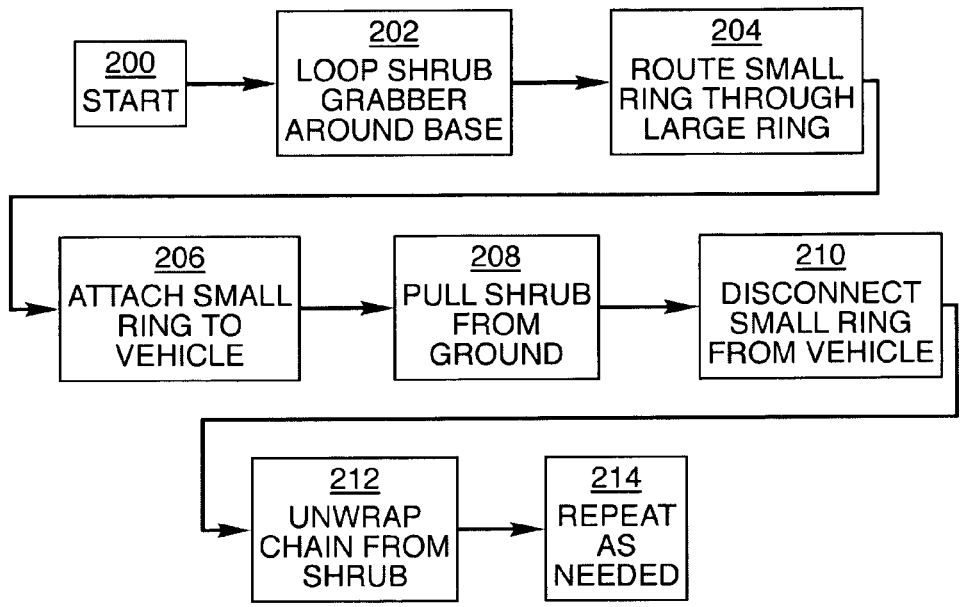
FIG. 3 shows a flow diagram of operation of a shrub remover in an embodiment of the present invention.
Figure 4:
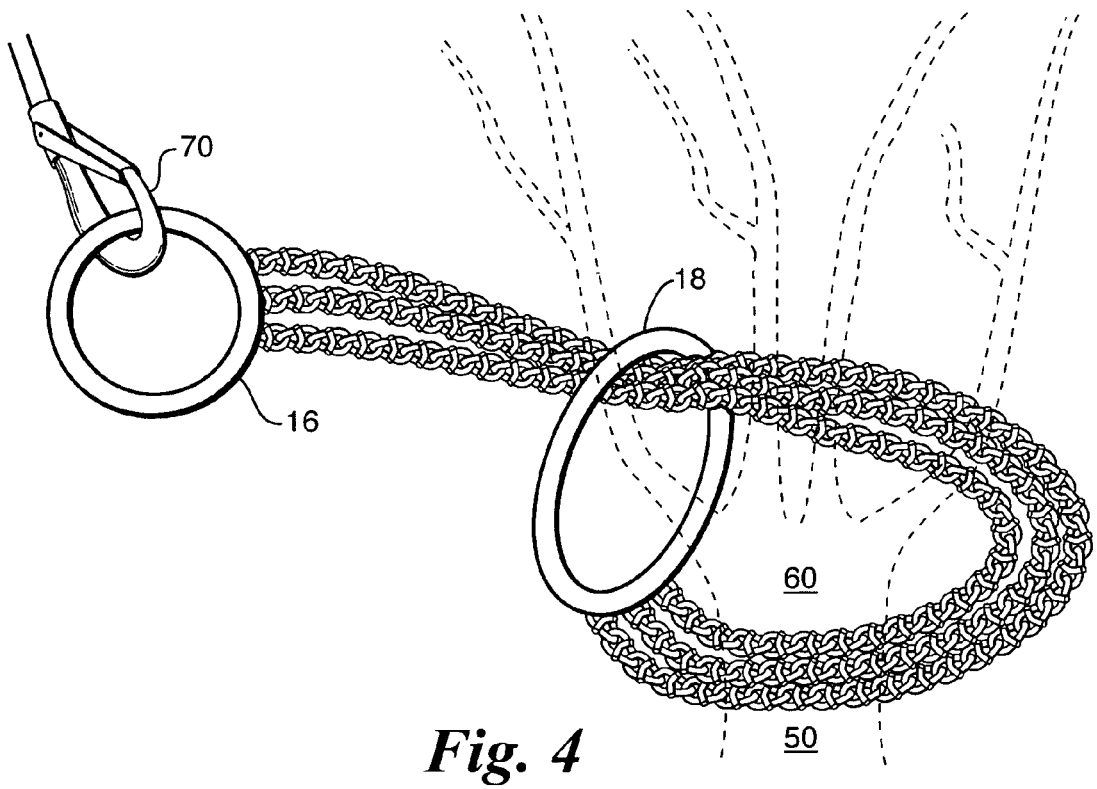
FIG. 4 shows a shrub remover placed around a shrub in an embodiment of the present invention.
Figure 5:
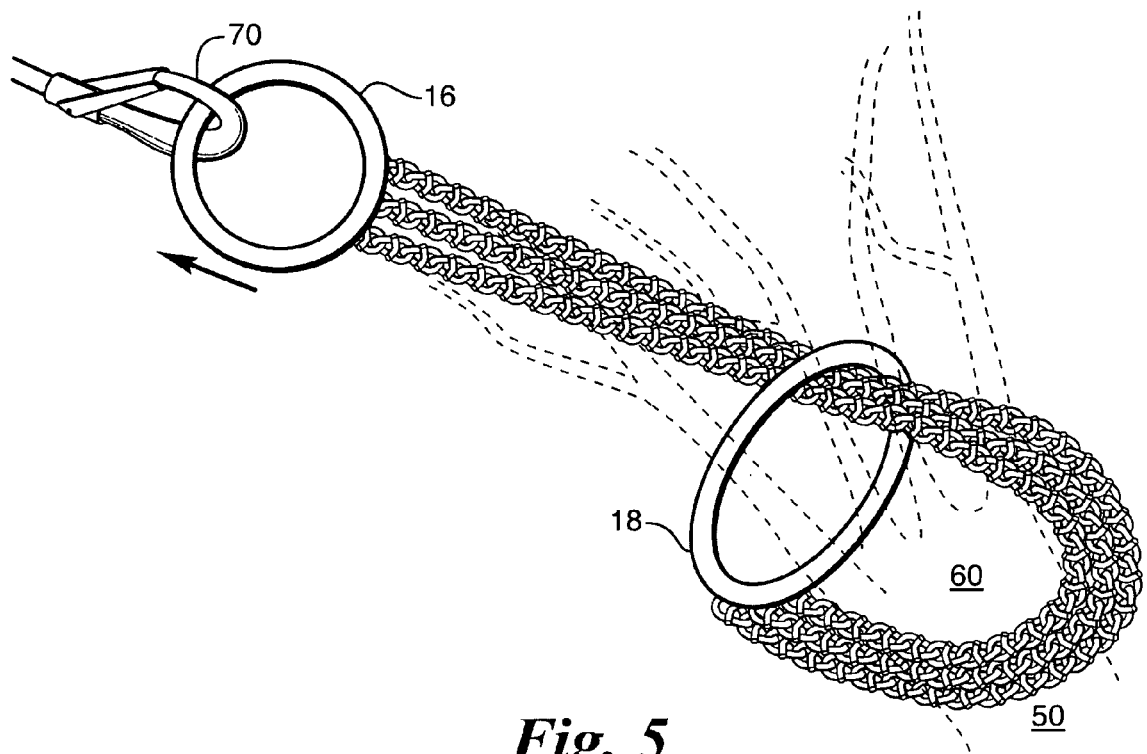
FIG. 5 shows a shrub remover placed around a shrub pulled from the ground in an embodiment of the present invention.

With reference to FIG. 3, a flow diagram of operation of a shrub remover in an embodiment of the present invention is shown. Process 200 can begin when the operator selects a shrub, bush, tree or clump of small trees which s/he desires to remove from the landscape. At state 202 the operator can set circular ring 18 on the ground and begin looping chain segments 20 around a base 50 of shrub 60 (FIG. 4). Circular ring 16 can then be routed through the center of circular ring 18 to close the loop at state 204. At state 206, the operator could attach circular ring 16 to a vehicle by coupling it to a self-closing hook 70 or by attaching circular ring to a ball-hitch (not shown). It is contemplated most any vehicle, such as an ATV (all terrain vehicle), a lawn mower or a truck, could be used without departing from the spirit of the invention. It is further contemplated circular ring 16 could be coupled in most any fashion to the vehicle without departing from the spirit of the invention. At state 208, the operator could then drive the vehicle away from the shrub and pull the shrub from the ground (FIG. 5).

When pulled by the vehicle, chain segment 20 begins to tighten around shrub 60. This causes barbs 32 to embed themselves into the flesh of the shrub. By embedding barbs 32 into the flesh of shrub 60 it is unlikely chain segment 20 will slip off of shrub 60. This tight grip makes it easy for the vehicle to pull the shrub from the ground. At state 210, shrub remover 10 can be disconnected from the vehicle. At state 212, circular ring 16 can be passed back through the center of circular ring 18 and the chain segments unwrapped from shrub 60. The shrub can then be disposed of and process 200 repeated all over again at state 214.

Figure 6:
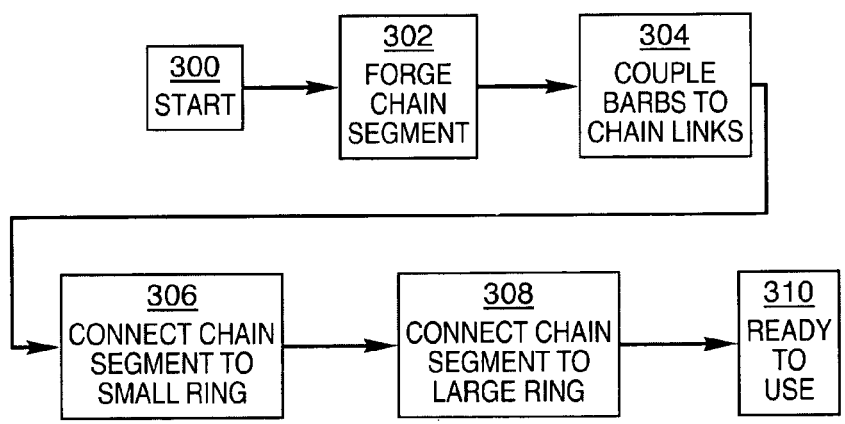
FIG. 6 shows a flow diagram of a process of making a shrub remover in an embodiment in the present invention.

With reference to FIG. 6, a flow diagram of a process of making a shrub remover in an embodiment in the present invention is shown. Shrub remover making process 300 can begin by forging chain segment 20 at state 302. Chain segment as discussed above could have the oval twisted shape. Chain segment 20 could also be purchased from most any distributor of hardware materials or chain manufacturers. At state 304 barb 32 is coupled to a plurality of chain links 24. As discussed above barb 32 can be welded to chain link 24 lengthwise across center 36 of chain link 24. As shown, barb 32 is coupled to chain link 24 across the narrow portion of oval chain link 24. A proximal end of chain segment 20 is coupled to circular ring 16 at state 306. At state 308, the distal end of chain segment 20 can be coupled to circular ring 18. As discussed above, chain segment 20 can be coupled to circular rings 16 and 18 in most any fashion, such as welding. Shrub remover 10 is now ready for use at state 310.

Thus, embodiments of the SHRUB REMOVER are disclosed. One skilled in the art will appreciate the present teachings can be practiced with embodiments other than those disclosed. The disclosed embodiments are presented for purposes of illustration and not limitation, and the present teachings are limited only by the claims follow.

What is claimed is:

1. A shrub removing apparatus comprising:
   (a) first and second ring members; and
   (b) a plurality of chain segments of generally equal length, each of the segments comprising a plurality of links where some of the links have a barb member affixed to them where the barb members extend across the links in a direction transverse to a length dimension of the chains, said chains being attached to the first and second ring members in a parallel arrangement where the ring members are of a differing diameter whereby the first ring member may pass through a central opening of the second ring member to form a loop.

2. The shrub removing apparatus of claim 1 wherein links of the chains are of a generally oval shape that has been twisted about a minor axis of the oval shape.

3. The shrub removing apparatus of claim 2 wherein opposed ends of the chains are welded individually to the first and second ring members and the barbs are welded to the links.

4. A method of extracting a shrub, roots and all, from the earth in which it is growing comprising the steps of:

(a) providing the apparatus of claim 1;
(b) wrapping the chain segments about a stem of a shrub to be extracted;
(c) feeding the first ring member through the central opening of the second ring member to form a loop encompassing the stems of the shrub; and
(d) applying a pulling force to the first ring member sufficient to extract the shrub from the ground.

5. The method of claim 4 wherein the pulling force is provided by a motorized vehicle to which the first ring member is attached.

\* \* \* \* \*